United States Patent

Ableitner et al.

[11] 4,411,237
[45] Oct. 25, 1983

[54] DRIVE MECHANISM FOR FUEL INJECTION PUMPS OF AN INTERNAL COMBUSTION ENGINE

[75] Inventors: Erich Ableitner, Remseck; Ulrich Conrad, Ludwigsburg; Hans-Otto Derndinger; Gerd Niemeier, both of Stuttgart, all of Fed. Rep. of Germany

[73] Assignee: Daimler-Benz AG, Fed. Rep. of Germany

[21] Appl. No.: 191,298

[22] Filed: Sep. 26, 1980

[30] Foreign Application Priority Data

Sep. 27, 1979 [DE] Fed. Rep. of Germany ....... 2939063

[51] Int. Cl.³ .......................................... F02M 59/20
[52] U.S. Cl. .................................. 123/501; 123/509; 74/15.63
[58] Field of Search ............... 123/509, 508, 507, 501, 123/198 C; 74/15.63

[56] References Cited

U.S. PATENT DOCUMENTS

| 3,401,572 | 9/1968 | Bailey | 123/501 |
| 3,742,925 | 7/1973 | Gordon, Jr. et al. | 123/501 |
| 4,142,498 | 3/1979 | Hammond | 123/501 |
| 4,198,948 | 4/1980 | Conrad et al. | 123/495 |
| 4,294,218 | 10/1981 | King et al. | 123/501 |

FOREIGN PATENT DOCUMENTS

| 1251243 | 12/1960 | France | 123/501 |
| 321814 | 11/1929 | United Kingdom | 123/501 |
| 467808 | 6/1937 | United Kingdom | 123/501 |
| 537958 | 7/1941 | United Kingdom | 123/501 |

Primary Examiner—Charles J. Myhre
Assistant Examiner—Magdalen Moy
Attorney, Agent, or Firm—Craig & Burns

[57] ABSTRACT

A drive mechanism for a fuel injection pump of an internal combustion engine, wherein a drive sprocket and an injection timer unit are arranged in a crankcase of the engine on a drive shaft connected to the camshaft of the fuel injection pump. The drive shaft is formed by a socket sleeve and is floatingly supported on the camshaft.

7 Claims, 1 Drawing Figure

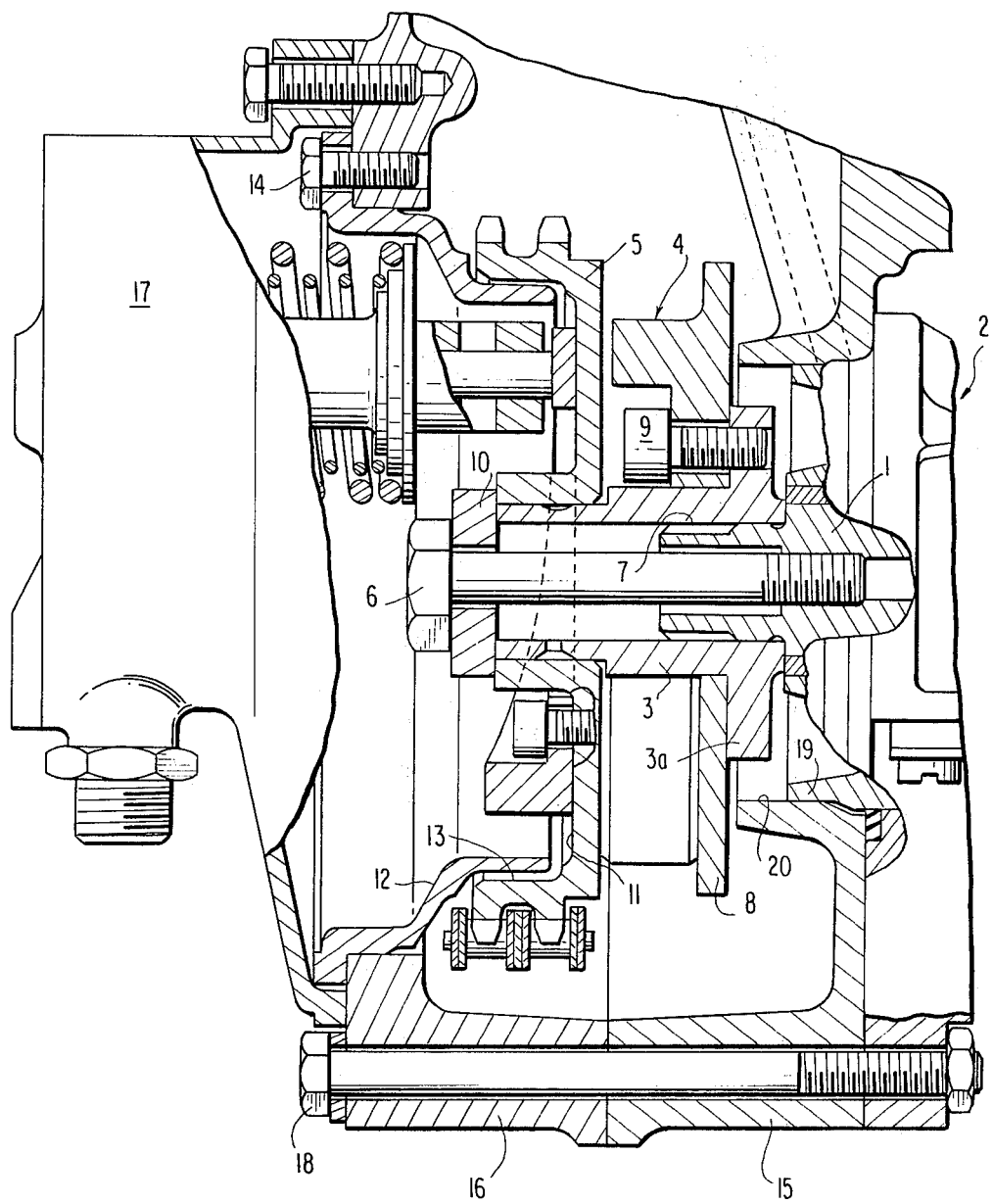

DRIVE MECHANISM FOR FUEL INJECTION PUMPS OF AN INTERNAL COMBUSTION ENGINE

The present invention relates to a drive mechanism and, more particularly, to a drive mechanism for fuel injection pumps of an internal combustion engine, wherein a drive sprocket and an injection timer unit are arranged in a crankcase of the internal combustion engine on a drive shaft connected to a camshaft of an injection pump.

The drive mechanisms for fuel injection pumps of the aforementioned type have been proposed and, in practical use, the drive shaft for the drive mechanism is generally dually supported, with the injection pump being flangedly connected to the crankcase with the camshaft of the injection pump being coupled to the drive shaft by way of a serrated sleeve.

A disadvantage of the above-noted proposed drive mechanisms resides in the fact that such a drive mechanism requires a construction having a relatively-long axial length, thereby resulting in considerable expenses for the structural parts as well as resulting in increase in the overall weight of the drive mechanism.

The aim underlying the present invention essentially resides in providing a drive mechanism for a fuel injection pump for internal combustion engines which has a smaller structural length, a lower weight and less frictional losses.

In accordance with advantages features of the present invention, the drive shaft of the drive mechanism for the fuel injection pump is formed by a socket sleeve which is floatingly supported on the camshaft of the injection pump.

By virtue of the above-noted features of the present invention, the customarily-provided long drive shaft necessarily supported in two sliding bearings is eliminated and only a short socket sleeve functions as a drive shaft, which sleeve may be pushed directly onto the camshaft of the injection pump thereby dispensing with the need for sliding bearings.

In accordance with further features of the present invention, the drive sprocket includes an annular recess engaged by a fixed centering ring. By virtue of the use of a centering ring, the injection timer unit is not pulled into the chain well by the tensioned drive chain in case an injection pump is exchanged and the camshaft of the injection pump may be pulled out of the socket sleeve after, for example, loosening a setscrew.

Advantageously, the centering ring may be attached to a timing case cover covering the crankcase or to an end wall of the crankcase. Moreover, the centering ring may be a part of an assembly such as, for example, the vacuum pump, which assembly is flanged to the timing case cover covering the crankcase or to the crankcase and wall.

Advantageously, in accordance with the present invention, a suitable fastener such as, for example, a setscrew, is employed to axially tighten the socket sleeve forming the drive shaft to the camshaft of the fuel injection pump.

To provide a coupling between the camshaft of the fuel injection pump and the socket sleeve forming the drive shaft, in accordance with still further features of the present invention, notched serrations forming a tooth system or gearing unit are provided between the camshaft and the socket sleeve.

Accordingly, it is an object of the present invention to provide a drive mechanism for a fuel injection pump for internal combustion engines which avoids, by simple means, shortcomings and disadvantages encountered in the prior art.

Another object of the present invention resides in providing a drive mechanism for fuel injection pumps for an internal combustion engine which enables a simple and direct coupling of the drive mechanism to the injection pump.

Yet another object of the present invention resides in providing a drive mechanism for injection pumps of internal combustion engines which shortens the axial length of a drive shaft of the drive mechanism and dispenses with the need for the provision of sliding bearings.

A further object of the present invention resides in providing a drive mechanism for injection pumps of internal combustion engines which minimizes the structural length and weight of the mechanism.

A still further object of the present invention resides in providing a drive mechanism for fuel injection pumps of internal combustion engines which minimizes the friction losses.

These and other objects, features, and advantages of the present invention will become more apparent from the following description when taken in connection with the accompany drawing which shows, for the purposes of illustration only, one embodiment in accordance with the present invention, and wherein:

The single FIGURE is a partial longitudinal cross-sectional view of a drive mechanism for a fuel injection pump for an internal combustion engine in accordance with the present invention.

Referring now to the single FIGURE of the drawing, according to this FIGURE, a drive shaft 3 is connected to a camshaft 1 of a fuel injection pump generally designated by the reference numeral 2. The drive shaft 3 carries an injection timer unit generally designated by the reference numeral 4 and a drive sprocket 5. The drive shaft 3 is formed by a socket sleeve having a flange 3a. The socket sleeve is floatingly supported on a shaft stub of the camshaft 1 and is axially braced together with the camshaft 1 by a suitable fastener such as, for example, a setscrew 6, so that the sleeve is entrained with the camshaft for rotation therewith.

To ensure a specific correlation of the camshaft 1 with the crankshaft (not shown) of an air-compressing, fuel-injected internal combustion engine, a notched serration 7 is provided between the camshaft 1 and the socket sleeve forming the drive shaft 3. The injection timer unit is attached by a suitable fastener such as, for example, screws or the like, through a secondary part 8 thereof to the flange 3a of the socket sleeve forming the drive shaft 3 while the drive sprocket 5, acting as a primary part, is rotatably supported on the drive shaft 3, that is, supported so as to be rotatable within a range of a predetermined adjusting angle. To provide for an axial limitation for the drive sprocket 5, a shim 10 is interposed between a head of the setscrew 6 and a free end of the drive shaft 3.

An annular recess 11 is provided in the drive sprocket 5, with the recess being engaged by a centering ring 12 in such a manner that only a small radial play of, for example, about 0.3 mm, is produced between the centering ring 12 and an outer annular surface 13 of the recess 11. The centering ring 12 may be attached by a suitable fastener such as, for example, screws 14, to a timing case cover 16 flanged to a crankcase 15 of the internal combustion engine or to an end wall of the crankcase 15. It is also possible for the centering ring 12 to be a part of an assembly 17 which assembly may, for example, be a vacuum pump for providing a power assist for the brakes of the vehicle, with the assembly being disposed in an opening of the timing case cover 16 and threadably joined thereto.

In order to exchange the fuel injection pump 2, the injection pump 2 is removed by loosening the setscrew 6 and additional screws 18 whereby the centering ring 12 takes over the positional fixation of the injection timer unit 4 with the drive sprocket 5.

To reassemble or replace the injection pump 2, the injection pump 2 is inserted in the socket sleeve 3 and placed into a center position by placing a centering collar 19 of the injection pump 2 into a corresponding centering bore 20 of the crankcase 15, with the injection pump 2 then being axially tightened by the setscrew 6. The injection pump 2 is then attached to the crankcase 15 by means of the screws 18.

While we have shown and described only one embodiment in accordance with the present invention, it is to be understood that the invention is not limited thereto, but is susceptible of numerous changes and modifications as known to one of ordinary skill in the art, and we therefore do not wish to be limited to the details shown and described herein but intend to cover all such changes and modifications as are obvious to those skilled in the art.

What is claimed is:

1. A drive mechanism for a fuel injection pump of an internal combustion engine, the drive mechanism including a drive shaft adapted to be connected to a camshaft of the fuel injection pump, a drive sprocket means provided on the drive shaft, and an injection timer means arranged on the drive shaft, characterized in that
    the drive shaft is formed as a socket sleeve member and is floatingly supported on the camshaft,
    means are provided for centering the drive sprocket means relative to the injection timing means,
    the drive sprocket means includes an annular recess engageable with the centering means,
    the drive sprocket means and injection timer means are disposed in a crankcase,
    a timing case cover means is provided for covering the crankcase, and
    the centering means is a centering ring attached to one of the timing case cover means and an end wall of the crankcase.

2. A drive mechanism for a fuel injection pump of an internal combustion engine, the drive mechanism including a drive shaft adapted to be connected to a camshaft of the fuel injection pump, a drive sprocket means provided on the drive shaft, and an injection timer means arranged on the drive shaft, characterized in that
    the drive shaft is formed as a socket sleeve member and is floatingly supported on the camshaft,
    means are provided for centering the drive sprocket means relative to the injection timing means,
    the drive sprocket means includes an annular recess engageable with the centering means,
    the drive sprocket means and injection timer means are disposed in a crankcase,
    a timing case cover means is provided for covering the crankcase,
    the centering means is a centering ring, the centering ring forms a part of the further assembly of the internal combustion engine, and the centering ring is flangeably attached to one of the timing case cover means and an end wall of the crankcase.

3. A drive mechanism according to claim 2, characterized in that the further assembly is a vacuum pump.

4. A drive mechanism for a fuel injection pump of an internal combustion engine, the drive mechanism including a drive shaft adapted to be connected to a camshaft of the fuel injection pump, a drive sprocket means provided on the drive shaft, and an injection timer means arranged on the drive shaft, wherein
    the drive shaft is formed as a socket sleeve member and is floatingly supported on the camshaft,
    means are provided for centering the drive sprocket means relative to the injection timing means,
    the drive sprocket means includes an annular recess engageable with the centering means,
    the drive sprocket means and injection timer means are disposed in a crankcase,
    a timing case cover means is provided for covering the crankcase,
    the centering means is a centering ring, the centering ring forms a part of the further assembly of the internal combustion engine, the centering ring is flangeably attached to one of the timing case cover means and an end wall of the crankcase,
    fastening means are provided for axially securing the sleeve member to the camshaft, and
    gearing means are provided for coupling the sleeve member to the camshaft.

5. A drive mechanism according to one of claims 1, or 2, characterized in that gearing means are provided for coupling the sleeve member to the camshaft.

6. A drive mechanism according to one of claims 1 or 2, characterized in that fastening means are provided for axially securing the sleeve member to the camshaft.

7. A drive mechanism for a fuel injection pump of an internal combustion engine, the drive mechanism including a drive shaft adapted to be connected to a camshaft of the fuel injection pump, a drive sprocket means provided on the drive shaft, and an injection timer means arranged on the drive shaft, wherein
    the drive shaft is formed as a socket sleeve member and is floatingly supported on the camshaft,
    means are provided for centering the drive sprocket means relative to the injection timing means,
    the drive sprocket means includes an annular recess engageable with the centering means,
    the drive sprocket means and injection timer means are disposed in a crankcase,
    a timing case cover means is provided for covering the crankcase,
    the centering means is a centering ring attached to one of the timing case cover means and an end wall of the crankcase,
    fastening means are provided for axially securing the sleeve member to the camshaft, and
    gearing means are provided for coupling the sleeve member to the camshaft.

* * * * *